United States Patent
Hails et al.

(10) Patent No.: US 8,033,044 B2
(45) Date of Patent: Oct. 11, 2011

(54) BYCATCH-FRIENDLY FISHING BUOY

(75) Inventors: Alan Robert Hails, Osprey, FL (US);
Peter Thomas Hull, Sarasota, FL (US);
Dean Dougherty, Sarasota, FL (US)

(73) Assignee: Mote Marine Laboratory, Inc., Sarasota, FL (US)

( * ) Notice: Subject to any disclaimer, the term of this patent is extended or adjusted under 35 U.S.C. 154(b) by 0 days.

(21) Appl. No.: 12/606,959

(22) Filed: Oct. 27, 2009

(65) Prior Publication Data

US 2011/0094146 A1 Apr. 28, 2011

(51) Int. Cl.
*A01K 93/02* (2006.01)
*A01K 79/00* (2006.01)

(52) U.S. Cl. ......... 43/17; 43/43.12; 43/43.13; 43/43.15; 43/43.1; 43/4

(58) Field of Classification Search ................ 43/15–17, 43/43.12, 43.13, 43.1, 43.11, 43.15, 4
See application file for complete search history.

(56) References Cited

U.S. PATENT DOCUMENTS

| | | | | | |
|---|---|---|---|---|---|
| 510,205 | A | * | 12/1893 | Stiner | 43/17 |
| 1,802,295 | A | * | 4/1931 | Wear | 43/43.13 |
| 2,122,836 | A | * | 7/1938 | Gegerfeldt | 43/4 |
| 2,198,286 | A | * | 4/1940 | Krivutza | 43/17 |
| 2,225,214 | A | * | 12/1940 | Goertzen | 43/17 |
| 2,490,669 | A | * | 12/1949 | Burke | 43/17 |
| 2,576,880 | A | * | 11/1951 | Jensen | 43/43.15 |
| 2,654,972 | A | * | 10/1953 | Hollingsworth | 43/17 |
| 2,759,291 | A | * | 8/1956 | Foglio | 43/43.15 |
| 2,786,294 | A | * | 3/1957 | Whitacre | 43/17 |
| 2,848,835 | A | * | 8/1958 | Witt | 43/43.15 |
| 2,901,855 | A | * | 9/1959 | Todd | 43/17 |
| 2,961,793 | A | * | 11/1960 | Buchanan | 43/43.1 |
| 3,010,238 | A | * | 11/1961 | Crumrine, Jr. et al. | 43/43.15 |
| 3,175,320 | A | * | 3/1965 | Dinger | 43/17 |
| 3,230,659 | A | * | 1/1966 | Colling | 43/43.11 |

(Continued)

FOREIGN PATENT DOCUMENTS

JP 03072831 A * 3/1991

(Continued)

OTHER PUBLICATIONS

"*Aftco Catalog*", 28 pages, American Fishing Tackle Company (2008), obtained from: http://www.aftco.com/catalog/AftcoCatalog2008.pdf.

(Continued)

*Primary Examiner* — Darren W Ark
(74) *Attorney, Agent, or Firm* — IPLM Group, P.A.

(57) ABSTRACT

A fishing buoy for reducing injury or premature mortality in target fish species and endangered or protected bycatch includes:
  a multi-axis swivel having first and second attachment points arrayed along a central first axis and a third attachment point arrayed along a distinct second axis;
  an anchor or other underwater restraining device;
  a ballast, float and a transmitter having a transmission state;
  a leader and at least one baitable hook;
  a fish strike trigger connected to the transmitter and temporarily coupled to the leader, or connected to the leader and temporarily coupled to the transmitter.
After a fish or bycatch strike the trigger changes the transmitter state to provide an indication that a strike has occurred, the leader and transmitter are decoupled, and the leader is free to rotate around the central axis without entangling the anchor or other underwater restraining device.

23 Claims, 6 Drawing Sheets

U.S. PATENT DOCUMENTS

| | | | | |
|---|---|---|---|---|
| 3,352,048 A | * | 11/1967 | Fleming | 43/17 |
| 3,462,870 A | * | 8/1969 | Terilli | 43/43.12 |
| 3,577,669 A | * | 5/1971 | Johnson et al. | 43/43.11 |
| 3,724,120 A | * | 4/1973 | Richard | 43/43.12 |
| 3,778,918 A | * | 12/1973 | Emory et al. | 43/43.12 |
| RE28,380 E | * | 4/1975 | Tison | 43/43.11 |
| 3,905,148 A | * | 9/1975 | Naone et al. | 43/43.12 |
| 3,908,299 A | | 9/1975 | Kalberer | |
| 3,939,595 A | * | 2/1976 | Lockett | 43/43.12 |
| 3,977,115 A | * | 8/1976 | Check | 43/43.11 |
| 4,069,611 A | * | 1/1978 | Dusich et al. | 43/43.12 |
| 4,214,394 A | | 7/1980 | Shogan | |
| 4,221,068 A | * | 9/1980 | Roemer, Jr. | 43/43.12 |
| 4,237,642 A | * | 12/1980 | Petorella | 43/43.13 |
| 4,267,659 A | * | 5/1981 | Grasso | 43/43.12 |
| 4,373,288 A | * | 2/1983 | McCrink | 43/17 |
| 4,428,142 A | * | 1/1984 | Shedd et al. | 43/43.12 |
| 4,430,823 A | * | 2/1984 | Henze et al. | 43/43.12 |
| 4,437,255 A | * | 3/1984 | Reed | 43/17 |
| 4,565,024 A | * | 1/1986 | Maerz | 43/17 |
| 4,569,146 A | * | 2/1986 | Lowrance et al. | 43/4 |
| 4,571,878 A | * | 2/1986 | Nyman | 43/43.11 |
| 4,574,516 A | * | 3/1986 | Shedd et al. | 43/43.12 |
| 4,581,842 A | | 4/1986 | Kalberer | |
| 4,611,423 A | * | 9/1986 | Rupp | 43/43.12 |
| 4,648,194 A | * | 3/1987 | Carroll, Jr. | 43/4.5 |
| 4,672,769 A | * | 6/1987 | Thompson | 43/43.11 |
| 4,766,688 A | | 8/1988 | Hiles | |
| 4,809,456 A | * | 3/1989 | Caparelli et al. | 43/17 |
| 4,817,328 A | * | 4/1989 | Hartley et al. | 43/43.12 |
| 4,825,580 A | * | 5/1989 | Gray | 43/43.11 |
| 4,831,762 A | * | 5/1989 | Harris | 43/17 |
| 4,831,769 A | | 5/1989 | Skille | |
| 4,856,224 A | * | 8/1989 | Fincher, Sr. | 43/43.12 |
| 4,858,369 A | * | 8/1989 | Collins | 43/43.11 |
| 4,901,468 A | * | 2/1990 | Blackledge | 43/17 |
| 4,934,090 A | * | 6/1990 | Storey et al. | 43/17 |
| 4,942,690 A | * | 7/1990 | Lund | 43/43.12 |
| 4,996,788 A | * | 3/1991 | Wieting et al. | 43/17 |
| 5,005,310 A | * | 4/1991 | Rinehart | 43/17 |
| 5,020,267 A | * | 6/1991 | Rasmussen | 43/43.13 |
| 5,020,268 A | * | 6/1991 | Combs, III | 43/43.13 |
| 5,048,219 A | * | 9/1991 | Georgescu | 43/17 |
| 5,068,995 A | * | 12/1991 | Rinehart | 43/17 |
| 5,097,618 A | * | 3/1992 | Stoffel | 43/17 |
| 5,168,651 A | * | 12/1992 | Wilson | 43/17 |
| 5,170,581 A | * | 12/1992 | Lyons | 43/17 |
| 5,207,013 A | * | 5/1993 | Bartok et al. | 43/4 |
| 5,222,317 A | * | 6/1993 | Georgescu | 43/17 |
| 5,224,284 A | * | 7/1993 | Kelsey et al. | 43/17 |
| 5,233,781 A | * | 8/1993 | Bigelow | 43/17 |
| 5,253,445 A | * | 10/1993 | Spoonemore | 43/17 |
| 5,261,180 A | | 11/1993 | Foster et al. | |
| 5,265,369 A | * | 11/1993 | Botkins | 43/43.11 |
| 5,276,994 A | * | 1/1994 | Thompson et al. | 43/43.13 |
| 5,337,510 A | * | 8/1994 | McCue | 43/43.12 |
| 5,339,558 A | * | 8/1994 | Monsen | 43/17 |
| 5,351,432 A | * | 10/1994 | Tse | 43/17 |
| 5,461,821 A | * | 10/1995 | Carter, Jr. | 43/43.12 |
| 5,515,638 A | * | 5/1996 | Shirley | 43/15 |
| 5,581,930 A | * | 12/1996 | Langer | 43/17 |
| 5,615,512 A | * | 4/1997 | Wang | 43/17 |
| 5,758,449 A | * | 6/1998 | Munsterman et al. | 43/17 |
| 5,819,465 A | * | 10/1998 | Bryant | 43/17 |
| 5,829,181 A | * | 11/1998 | Fielder et al. | 43/17 |
| 5,829,184 A | * | 11/1998 | Studanski | 43/43.13 |
| 5,867,932 A | * | 2/1999 | Reiger | 43/43.13 |
| 5,881,488 A | | 3/1999 | Canepa | |
| 5,913,670 A | * | 6/1999 | Anderson et al. | 43/43.12 |
| 5,987,806 A | * | 11/1999 | Spencer | 43/43.11 |
| 6,029,391 A | * | 2/2000 | Holley et al. | 43/43.11 |
| 6,092,325 A | * | 7/2000 | Walker | 43/43.11 |
| 6,321,481 B1 | * | 11/2001 | Presnell | 43/43.1 |
| 6,347,478 B1 | * | 2/2002 | Stephens et al. | 43/43.1 |
| 6,397,510 B1 | * | 6/2002 | Klein | 43/17 |
| 6,401,382 B2 | * | 6/2002 | Larkin | 43/43.11 |
| 6,457,896 B1 | * | 10/2002 | deDoes | 403/2 |
| 6,564,500 B1 | * | 5/2003 | Ames | 43/43.12 |
| 6,671,994 B1 | * | 1/2004 | Klein | 43/17 |
| 6,708,441 B2 | * | 3/2004 | Dirito | 43/17 |
| 6,763,629 B1 | * | 7/2004 | Bennett | 43/16 |
| 6,796,076 B1 | * | 9/2004 | Bennett | 43/16 |
| 7,406,796 B1 | * | 8/2008 | Koch | 43/43.12 |
| 2002/0095850 A1 | * | 7/2002 | Jones | 43/4 |
| 2006/0230666 A1 | * | 10/2006 | Moffitt | 43/4.5 |
| 2008/0307690 A1 | * | 12/2008 | Jusseit | 43/43.1 |

FOREIGN PATENT DOCUMENTS

| | | |
|---|---|---|
| JP | 2002286841 A * | 10/2002 |
| JP | 2006230364 A * | 9/2006 |

OTHER PUBLICATIONS

"How to use a 3-way Swivel Rig" Sandy Point Camp, Kawashegamuk Lake, 4 pgs (Jul. 30, 2007), obtained from the Internet Archive at: http://web.archive.org/web/20070730190130/http://www.fishing-hunting-dryden.com/how-to-use-a-3-way-swivel-rig.htm.

Intelo Tracker product information sheets, 3 sheets (2009), obtained from: http://www.trackerradio.com/Products/Collars-(Transmitters)/Intelo.

* cited by examiner

BYCATCH-FRIENDLY FISHING BUOY

TECHNICAL FIELD

The present invention relates to fishing.

BACKGROUND

Longline fishing is a widely practiced fishing technique. Longlines may employ hundreds of baited hooks deployed along miles of lines. The hooks are intended to catch various target species including grouper, tilefish, and sharks. Unfortunately longlines instead often snare other fish or wildlife, called bycatch, including endangered or threatened marine species such as dolphins and sea turtles. Baited hooks typically stay submerged for hours. Bycaught turtles and other non-target marine species frequently drown because they cannot swim to the surface to breathe. Surviving marine animals and other bycatch may be released, but may die soon thereafter due to physiological stress. Hooked catch and bycatch also are preyed upon by other sea creatures or become injured by entanglement in the fishing gear. Entanglement is aggravated by the normal actions of hooked animals, which generally respond by wriggling, swimming frantically, rapidly changing course, etc. Actions such as these often cause or increase entanglement.

The waters off the west coast of Florida, where longline reef fishing is a prominent industry, serve as valuable habitat for sub-adult and breeding-age loggerhead turtles which swim in the sea and nest on Florida beaches. Loggerheads are found in Florida west coast waters throughout the year. During the last decade, there has been a decline of over 40% in Florida loggerhead turtle nesting. Recently, the National Marine Fisheries Service (NMFS) was sued under the Endangered Species Act for failing to protect threatened and endangered sea turtles in the Gulf of Mexico longline fishery. In response, NMFS ordered an emergency fishery closure to protect sea turtles. Studies showed that nearly 1,000 threatened and endangered sea turtles had been captured between July 2006 and the end of 2007. Under a three-year incidental capture authorization, bottom longliners had been allowed to capture up to 85 loggerheads (42 lethal captures), 26 green turtles, 2 Kemp's ridleys, and 1 leatherback. NMFS observers reported in September, 2008 that the actual catch had been 974 hard-shelled turtles, including 700 loggerheads, with 83% of captures resulting in injury or death to turtles. Fishing personnel and the Gulf of Mexico Fishery Management Council have made numerous suggestions for ways to reduce longline sea turtle captures, but it is unlikely that these changes will significantly reduce the number of bycaught turtles or avoid serious harm to the turtle population.

Fishing may also be carried out by assembling buoys, with attached fishing tackle, into an array. Like longline fishing, there are environmental concerns associated with array fishing methods. Arrays generally include 10, 20, or more buoys. Attending to all the buoys in an array can be challenging, as buoys are often separated by considerable distances and consequently may remain unattended for long periods of time. More frequent attention to buoys requires more boats and more personnel, which adds to costs. Unfortunately, the inability to attend to buoys often results in high mortality of both intentional catch and bycatch. As is the case for longline fishing, mortality in an infrequently attended array may be caused by entanglement, predation by other marine life, or drowning.

Patents or applications relating to fishing include U.S. Pat. Nos. 3,908,299 (Kalberer '299), 4,214,394 (Shogan), 4,437,255 (Reed), 4,581,842 (Kalberer '842), 4,766,688 (Hiles), 4,831,769 (Skille), 5,170,581 (Lyons), 5,261,180 (Foster et al.), 5,881,488 (Canepa), 6,397,510 B1 (Klein), 6,457,896 B1 (deDoes), 6,564,500 B1 (Ames) and 6,708,441 B2 (Dirito) and U.S. Patent Application Publication Nos. US 2006/0230666 A1 (Moffitt) and US 2008/0307690 A1 (Jusseit).

Currently, there is an unmet need for fishing equipment that will reduce harm to turtles and other protected marine life.

SUMMARY OF THE INVENTION

The present invention provides, in one aspect, a fishing buoy comprising:

a multi-axis swivel having first and second attachment points arrayed along a central first axis and a third attachment point arrayed along a distinct second axis, wherein the first and second attachment points rotate without limitation with respect to one another and the third attachment point rotates without limitation around the second axis; an anchor or other underwater restraining device connected to the first attachment point;

a ballast, float and a transmitter having a transmission state, connected to one another and to the second attachment point;

a leader connected to the third attachment point and to at least one baitable hook;

a fish strike trigger connected to the transmitter and temporarily coupled to the leader, or connected to the leader and temporarily coupled to the transmitter;

wherein after a fish or bycatch strike the trigger changes the transmitter state to provide an indication that a strike has occurred, the leader and transmitter are decoupled, and the leader is free to rotate around the central axis without entangling the anchor or other underwater restraining device.

The invention provides, in another aspect, a method for fishing comprising deploying in a fishery a plurality of such buoys, and landing targeted caught species and releasing protected or endangered bycaught species hooked by such buoys.

The invention provides, in yet another aspect, a multi-axis swivel having first and second openable and closeable attachment points arrayed along a central first axis and a third openable and closeable attachment point arrayed along a distinct second axis, wherein:

the first and second attachment points rotate without limitation with respect to one another, the third attachment point rotates without limitation around the second axis, the first, second and third attachment points each rotate without limitation around the central axis, and each of the first, second and third attachment points respectively have at least 180 degree freedom of rotation around a respective axis of rotation distinct from the central axis.

BRIEF DESCRIPTION OF THE DRAWING

The present invention will be better understood by way of the specific embodiments shown in the following figures, the purpose of which is to illustrate the invention rather than to limit its scope.

Like reference symbols in the various figures of the drawings indicate like elements. The elements in the drawing are not to scale.

DETAILED DESCRIPTION

Figure 1:
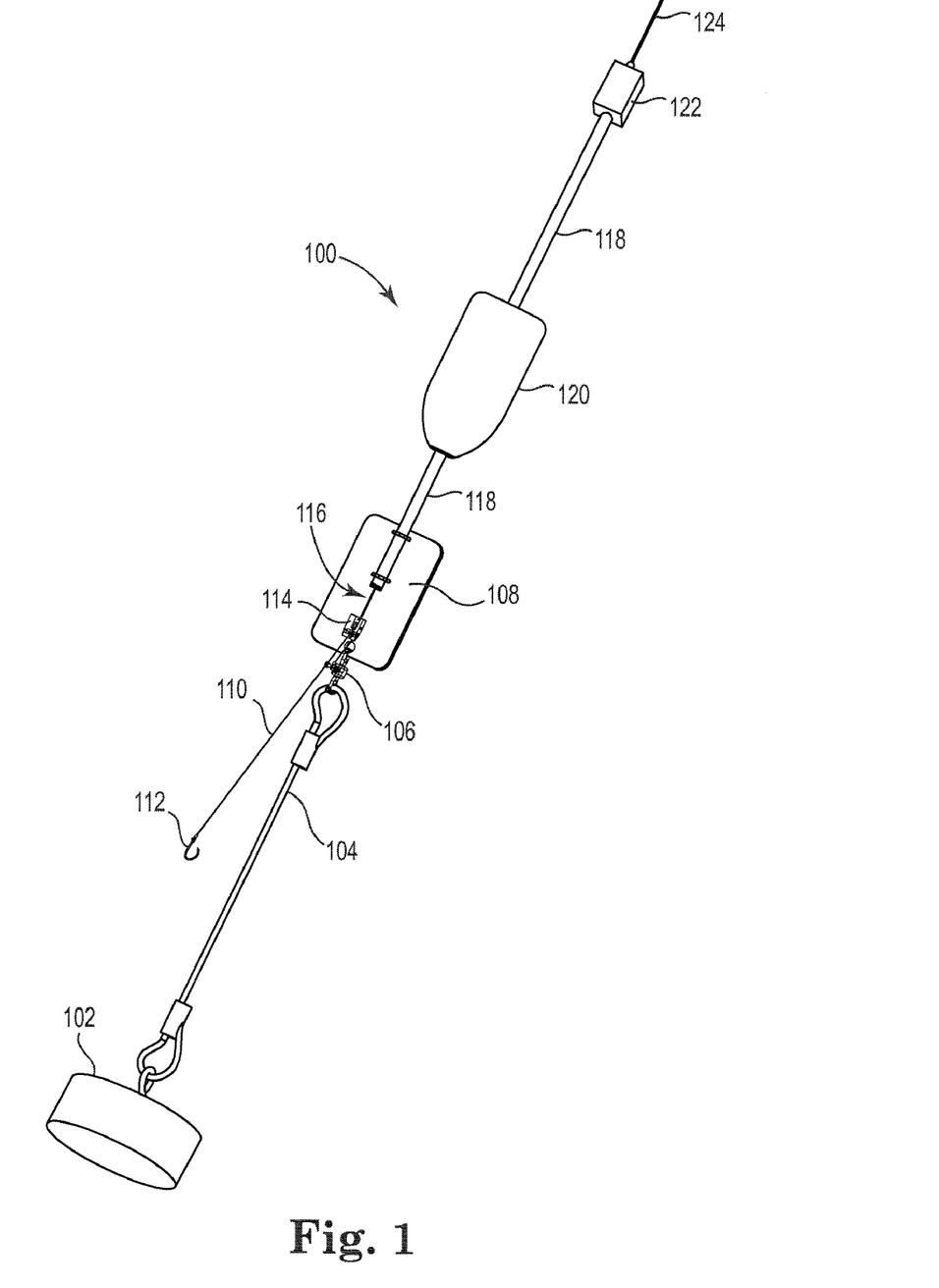
FIG. 1 is a perspective view of the disclosed fishing buoy.

Referring to FIG. 1, radio alarm fishing buoy 100 is shown in perspective view. Buoy 100 may be secured to, or otherwise discouraged from drifting over, a seafloor, riverbed, ocean bottom or other underwater structure by weight or other anchor 102. Anchor rode 104 connects anchor 102 to triple swivel shackle 106 (shown in greater detail in FIG. 2). Triple swivel 106 is also connected to ballast 108 and one end of leader 110, whose other end is connected to hook 112. For some fishing situations leader 110 may be relatively short, e.g., 2 meters or less in length, whereas in other fishing situations leader 110 may have a length of 20 to 30 meters or more. Leader 110 should in any event be sufficiently long to permit air-breathing bycatch to reach the surface in order to breathe. Although not shown in FIG. 1, hook 112 normally is baited in order to attract fish. Prior to a strike by a fish or bycaught species, leader 110 passes through or is otherwise temporarily coupled to snatch block 114 (shown in greater detail in FIG. 3). Snatch block 114 is connected or otherwise coupled to trigger line 116 which passes through hollow spar 118 and float 120 and thence to trigger mechanism and transmitter 122 (shown in greater detail in FIG. 4 and FIG. 5). After a strike, snatch block 114 pulls trigger line 116 downward (viz., towards the riverbed, lake or sea bottom or ocean floor), away from trigger mechanism and transmitter 122, thereby activating the trigger mechanism and changing the transmitter state so as to provide an indication (preferably a buoy specific indication sufficient to enable ready identification of a triggered buoy in an array of buoys) that a strike has occurred. A variety of changed transmitter states may be employed, e.g., the initiation of radio signal transmission via antenna 124, or the alteration of frequency, transmission interval or other characteristics of signals sent before the strike. When sufficient force is applied by leader 110 to snatch block 114, snatch block 114 opens and releases leader 110, decoupling leader 110 and leaving it free to rotate around a central axis corresponding to anchor rode 104 without becoming entangled with anchor rode 104 or other components of buoy 100. As discussed in more detail below, the required snatch block opening force should exceed the force required to activate the trigger mechanism.

Figure 2:
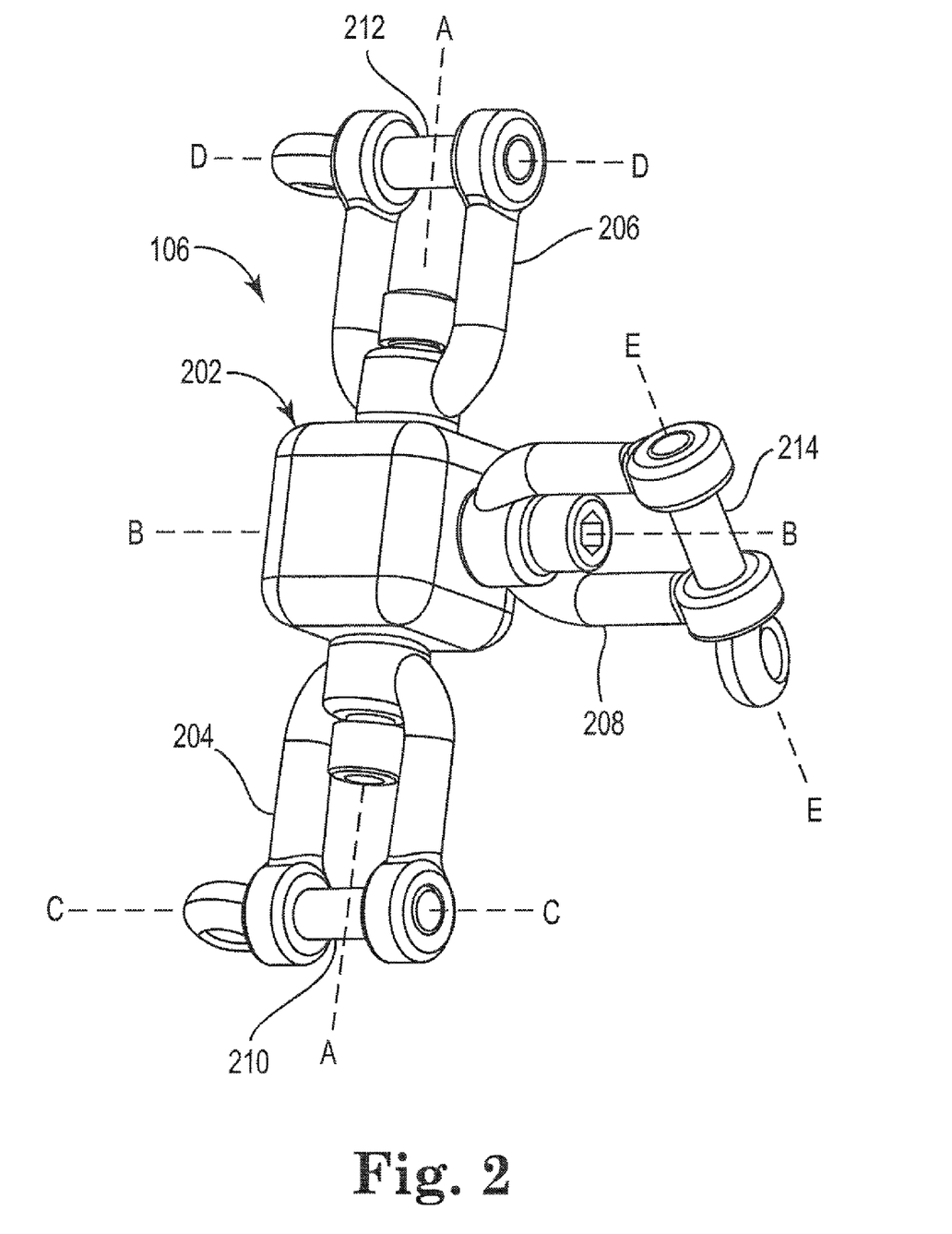
FIG. 2 is a perspective view of a triple swivel shackle.

FIG. 2 is a perspective view of triple swivel 106. Triple swivel 106 includes common base 202 joined to openable and closeable first shackle 204 (for coupling to anchor rode 104), openable and closeable second shackle 206 (for coupling to ballast 108), and openable and closeable third shackle 208 (for coupling to leader 110). Shackles 204, 206 and 208 respectively may include fasteners such as screw-pins 210, 212 and 214 to permit opening and closing each shackle and to assist in attaching triple swivel 106 to the other components of buoy 100. At least one and preferably both of shackles 204 and 206 rotate without limitation around axis A (viz., for as many 360 degree revolutions as may be desired). Shackle 208 can rotate without limitation around axis B as well as around axis A. Shackle 208 desirably can rotate around axis A without twisting or otherwise affecting shackles 204 and 206, thereby avoiding spinning ballast plate 108 or anchor rode 104 when a hooked catch or bycatch swims around buoy 100.

Axis A and axis B are distinct and desirably perpendicular with respect to one another. Triple swivel 106 accordingly provides a multi-axis swivel having first and second attachment points arrayed along a central first axis and a third attachment point arrayed along a distinct second axis, wherein at least one of the first and second attachment points can rotate without limitation with respect to the central axis and the third attachment point can rotate without limitation around the second axis. Screw-pins 210, 212 and 214 respectively provide further freedom of rotation, desirably more than 180 degree freedom of rotation and most desirably at least 270 degree freedom of rotation, around respective axes C, D and E. Most preferably lines or other components connected to shackles 204, 206 and 208 each have two-axis freedom of rotation at any given moment after a fish strike, including at least 360 degree rotation about axis A or axis B and at least 180 degree rotation about axis C, axis D or axis E.

Figure 3:
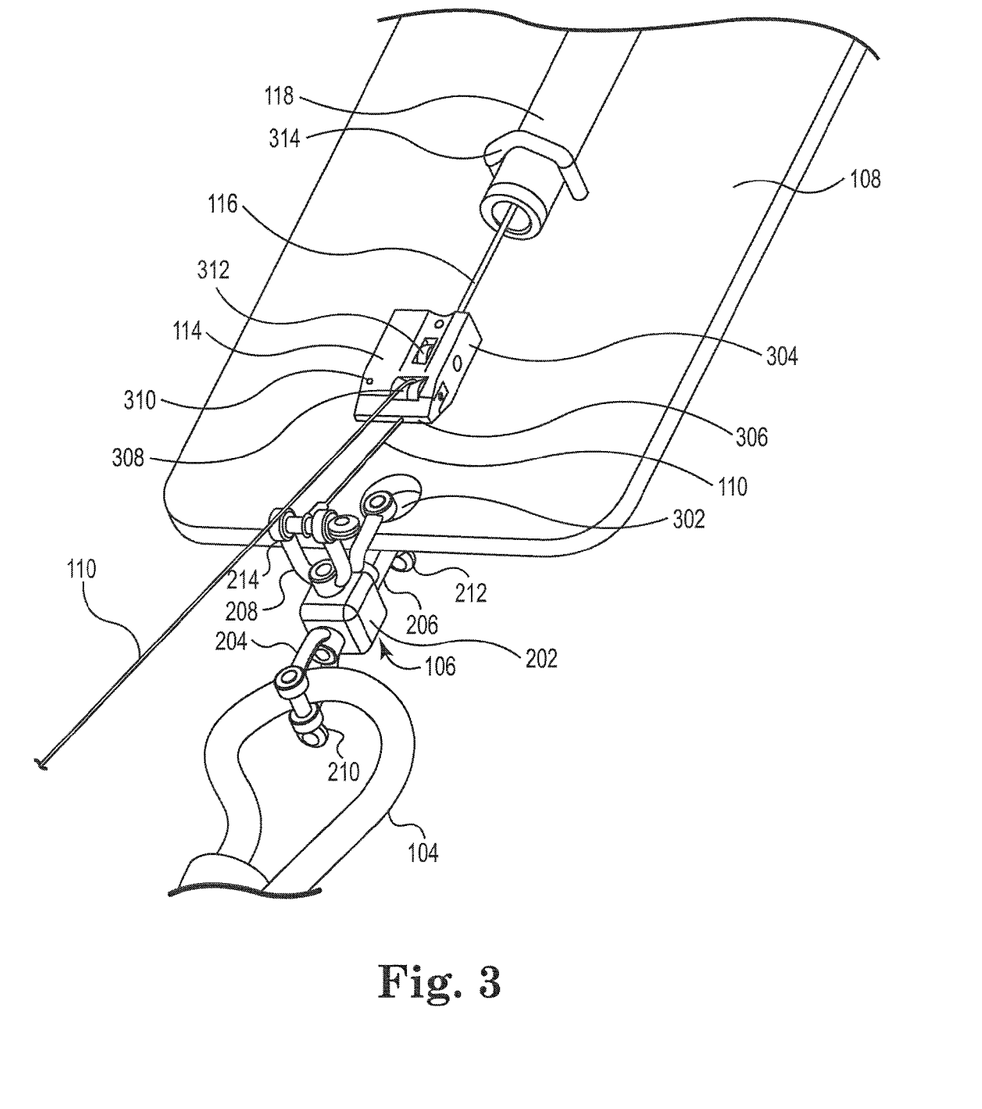
FIG. 3 is a perspective view of a snatch block and ballast.

FIG. 3 is a perspective view showing portions of anchor rode 104, triple swivel 106, ballast 108, and snatch block 114. Ballast 108 provides a connection point (viz., hole 302) for screw-pin 212 and shackle 206. The plate form for ballast 108 shown in FIG. 1 and FIG. 3 helps reduce or otherwise dampen rotation of the components above (viz. towards the water surface) triple swivel 106 relative to the components below (viz., towards the riverbed, lake or sea bottom or ocean floor) triple swivel 106. Ballast 108 also helps keep spar 118 upright and trigger mechanism and transmitter 122 out of the water. Snatch block 114 includes body 304, an assembly including nose bar 306 and pulley 308 mounted on and rotatable about pivot 310, and knurled locking wheel 312. Snatch block 114 may be spaced from the end of spar 118 as is shown in FIG. 3, may abut the end of spar 118, or may bear against a stop or other projection on ballast 108. The latter two configurations may be used to apply a tension preload to trigger line 116. Anchor rode 104 and trigger line 116 desirably are in an in-line or at least parallel relationship to one another. Clamp 314 helps fasten hollow spar 118 to ballast 108. Prior to a strike, leader 110 is wrapped partially around pulley 308 and has a relatively short portion and a considerably longer portion. The short portion lies between shackle 208 and snatch block 114, and desirably has a fixed parallel or fixed slightly oblique angular orientation with respect to anchor rode 104, trigger line 116 and hollow spar 118, and limited freedom of rotation (viz., less than 180 degrees) relative to trigger line 116 and hollow spar 118. The longer portion of leader 110 between snatch block 114 and hook 112 desirably has a changeable, generally oblique angular orientation with respect to anchor rode 104, trigger line 116 and hollow spar 118. Application of a pulling force to hook 112 applies a downward force to trigger line 116. After a strike and the application of sufficient force to trigger line 116 to actuate trigger mechanism and transmitter 122, nose bar 306 and pulley 308 swing away from body 304, releasing leader 110 so that it may generally straighten and run directly from hook 112 to screw-pin 214 and no longer apply force to trigger line 116. Buoy 100 accordingly provides a mechanical fish strike signal which can indicate that buoy 100 requires attention, together with a release or other decoupling of leader 110 which enables hooked catch or bycatch to swim around buoy 100 and if need be reach the surface for air while reducing the likelihood of leader entanglement with buoy 100 and consequent injury or premature mortality.

Figure 4:
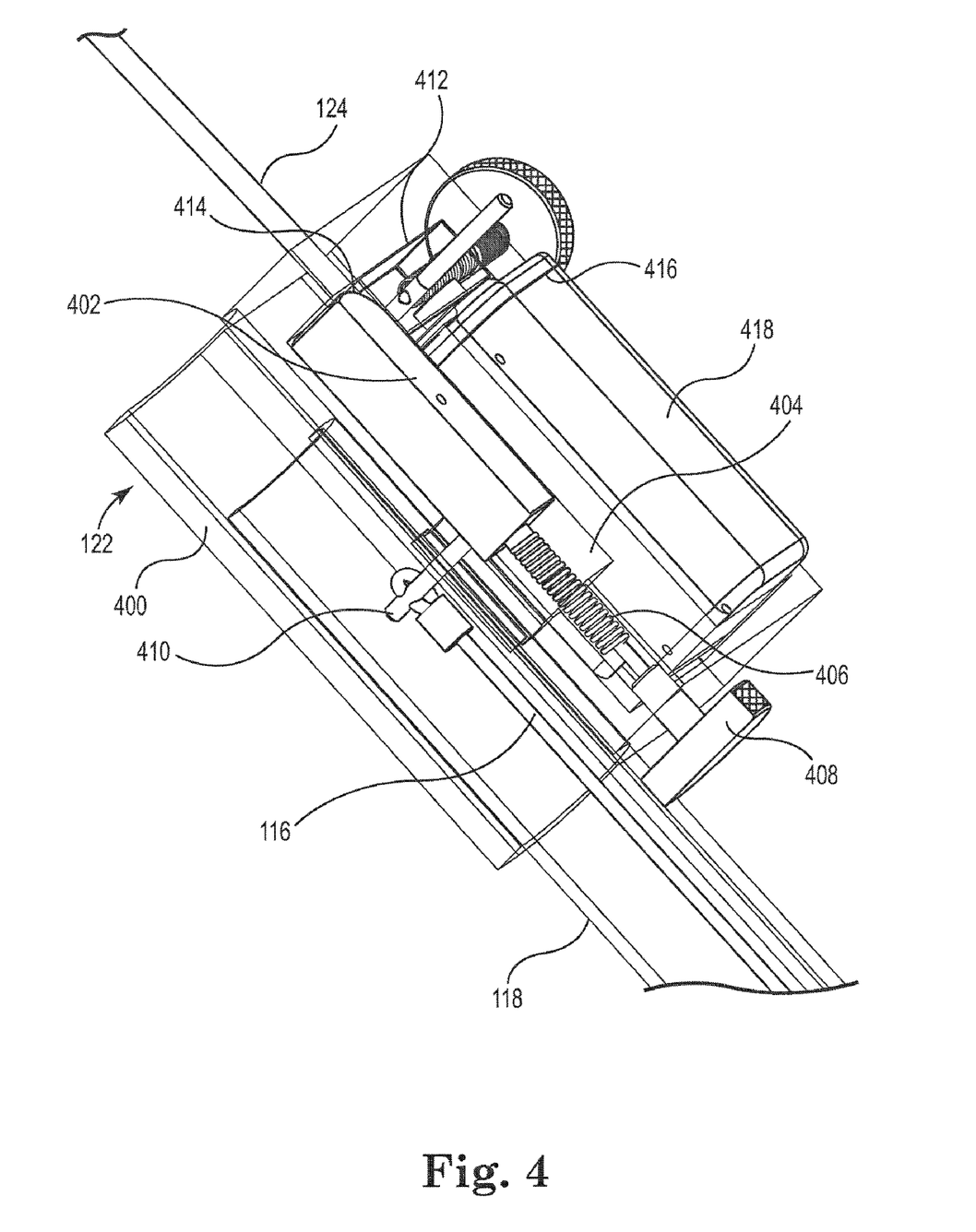
FIG. 4 is a perspective view, partially in section, of a trigger mechanism and transmitter.

FIG. 4 is a perspective view, partially in section, of trigger mechanism and transmitter 122. The trigger mechanism includes a housing 400 containing slide 402 which is biased toward the upper end of slot 404 by compression spring 406. The force exerted by spring 406 against slide 402 (and the force required to actuate the trigger mechanism) may be altered using trigger force adjustment screw 408. When a strike occurs and before leader 110 pulls free from snatch block 114, slide 402 is pulled downward in slot 404 towards ballast 108 and snatch block 114, due to tension or increased tension on trigger line 116. The movement of slide 402 in response to such tension allows sliding magnetic actuator 412 (also shown in FIG. 5) to move over rounded end 414 of slide 402, thereby enabling closure of a magnetic on-off switch (not shown in FIG. 4 or FIG. 5) inside end cap 416 of transmitter 418. The transmitted signal may be encoded or otherwise made buoy specific so as to identify a specific buoy in an array of buoys and enable fishing personnel to identify which buoy or buoys may require servicing. Aside from the transmitter, the buoy need not employ electronics or software. The buoy also makes minimal use of electrical components, thereby reducing manufacturing and maintenance costs and improving reliability and robustness in ocean environments.

Figure 5:
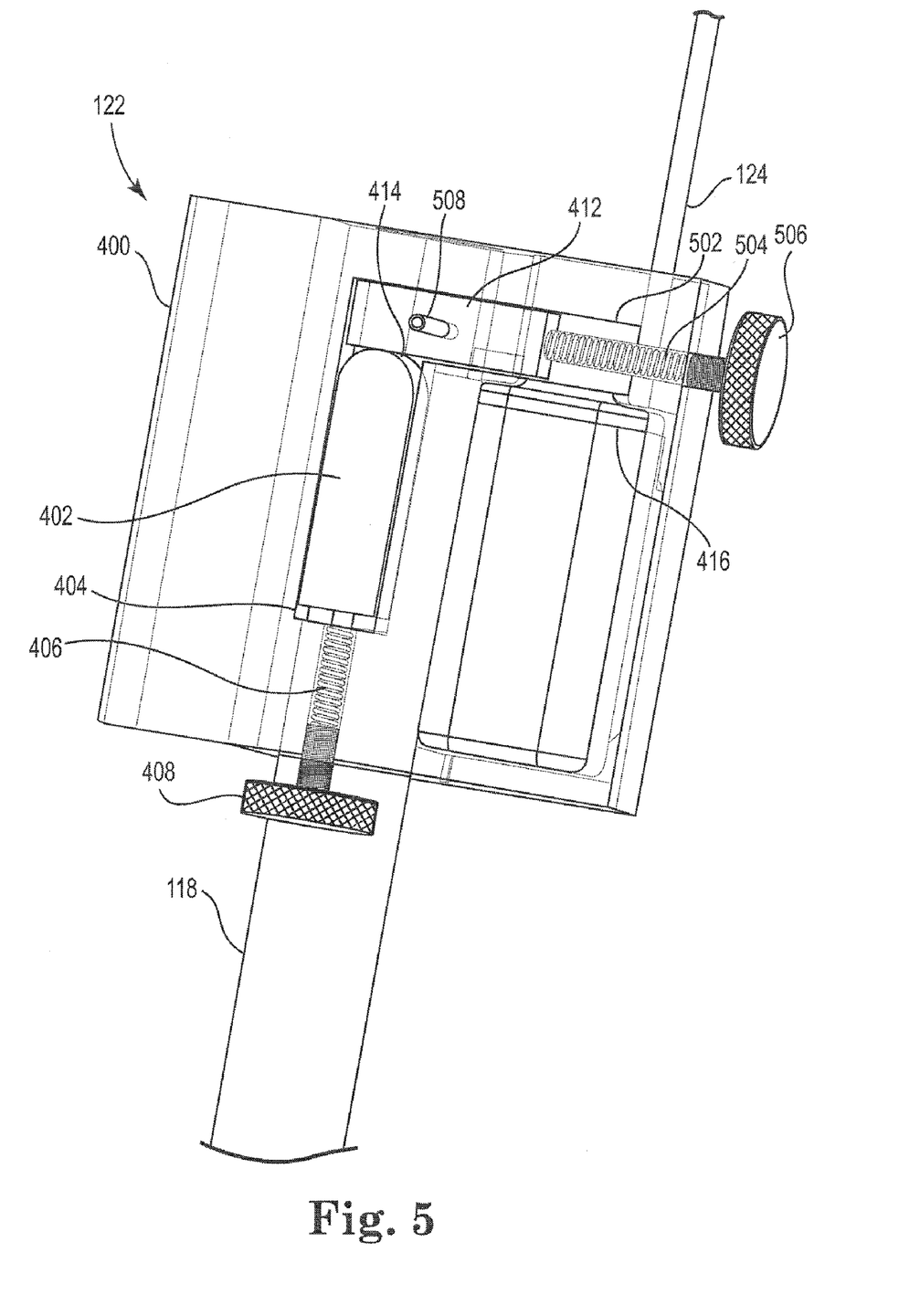
FIG. 5 is another perspective view, partially in section, of the FIG. 4 trigger mechanism and transmitter.

FIG. 5 shows another perspective view, partially in section, of trigger mechanism and transmitter 122 in its tripped position. Actuator 412 has moved over rounded end 414 in response to downward movement of slide 402 in slot 404. Actuator 412 moves within slot 502, and is biased toward rounded end 414 by compression spring 504. The force exerted by spring 504 against actuator 412 (and the force required to reset the trigger mechanism) may be altered using actuator adjustment screw 506. The trigger mechanism may be reset by manually moving pin 508 attached to actuator 412 so as to compress spring 504 and permit slide 402 to return to the upper end of slot 404.

The disclosed buoy desirably may be altered or adjusted to improve performance and reduce the incidence of false strike indications. When sufficient force has been applied to hook 112 and leader 110, trigger line 116 is released and the magnetic switch in transmitter 418 is enabled. Upon the application of further force, snatch block 114 opens and releases leader 110, and trigger line 116 and its associated trigger mechanisms no longer receive the loads and vibrations delivered via the leader. As noted above, the force required to actuate the trigger mechanism should be less than the force required to release leader 110 from snatch block 114. The snatch block release force may be altered by choosing an appropriate snatch block size or geometry, by employing a snatch block with an adjustable opening force, by rearranging the tackle, or using other modifications that will be recognized by persons having ordinary skill in the fishing art following their review of the present disclosure. For example, rather than connecting snatch block 114 to trigger line 116 and temporarily coupling snatch block 114 to leader 110, the connection and temporary coupling may be reversed so that snatch block 114 is connected to leader 110 and temporarily coupled to trigger line 116. This may for example be accomplished by passing and if need be knotting leader 110 through a hole, eyelet or other suitable fastening point in or on body 304, and by threading trigger line 116 over snatch block pulley 308 and attaching trigger line 116 to ballast 108. Such an arrangement may considerably increase the force required to trip the trigger mechanism (e.g., by a factor of four in some embodiments), thus facilitating sensitivity adjustment for large or small fish strike forces and forces generated by waves and other environmental factors. Other modification may be made to improve discrimination between potential false alarms and valid "hooked fish" events. For example, false alarms may occur due to fish biting but not taking the hook, fish becoming unhooked, or other forces imparted to the leader by the underwater environment. False alarms may be reduced by choosing trigger mechanism springs having different weights based on the size and bite characteristics of the desired target fish. The trigger mechanism may be adapted to trip when a preset number of multiple pulls of a minimum force, a sustained pull of a minimum duration and force, a pattern of strikes or combinations of these have been detected. The trigger may be set so as not to activate the transmitter until such events or combinations of events have occurred, or a second "catch assured" transmission may be sent after a transmission corresponding to an initial strike. For example, a magnet may be incorporated into slide 402 and one or more magnetic proximity switches may be added in a nearby portion of transmitter 418 to sense slide movement prior to trigger actuation.

Figure 6:
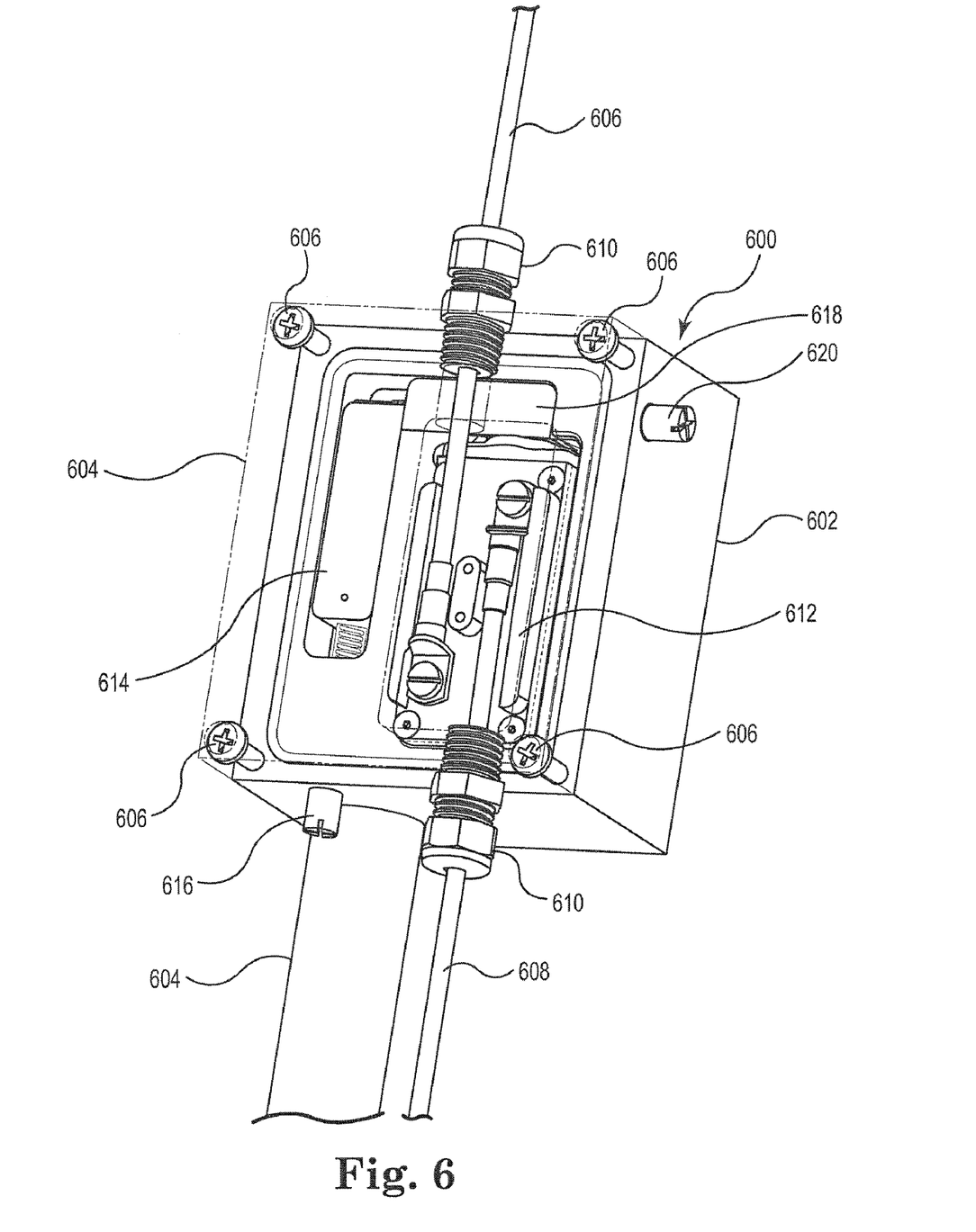
FIG. 6 is a perspective view, partially in section, of another trigger mechanism and transmitter.

FIG. 6 shows a perspective view, partially in section, of a trigger mechanism and transmitter 600. Trigger mechanism and transmitter 600 includes housing 602 and cover 604 (shown in phantom) fastened to housing 602 using screws 606. Housing 602 is mounted on spar 604. Antennas 606 and 608 are mounted in housing 600 using watertight ferrules 610 and are connected to transmitter 612. Slide 614, screw 616, magnetic actuator 618 and screw 620 may be used to adjust the trigger trip force and required reset force.

Several components including triple swivel 106, ballast 108, spar 118, float 120, housing 400 and the disclosed trigger mechanism were fabricated specially for use in the disclosed buoy. Many other components employed in the buoy may be procured commercially. For example, snatch block 114 may be obtained as a component of a ROLLER-TROLLER™ outrigger clip or flat line clip from Aftco Mfg. Co., Inc. in Irvine, Calif. and transmitter 418 may be obtained as a component of an INTELO™ dog tracking collar from Tracker Radio Location Systems in Knoxville, Tenn. Other components in the disclosed buoy (e.g., anchor 102, anchor rode 104, leader 110 and hook 112) are widely available from fishing tackle suppliers. The various buoy components may be made from a number of materials appropriate to their required functions, e.g., from metal, reinforced or unreinforced plastic, wood and other materials that will be familiar to persons having ordinary skill in the art of fishing.

The disclosed buoy may be modified in a number of ways beyond those already mentioned above. For example, anchor 102 may be replaced by a sea anchor or other suitable underwater restraining device which does not rest on an underwater structure but resists being pulled through the water, and the thus-modified buoy may be allowed to drift in a line-taut condition. Leader 110 may include optional added swivels (e.g., snap swivels), weights (e.g., crimp-on, rubberized or eyelet-equipped weights), line splitters, lines of varying caliber or strength and other tackle components that will be familiar to persons having ordinary skill in the fishing art. Triple swivel 106 may be replaced by a less expensive twin swivel version having rotatable shackles for attachment to anchor rode 104 and leader 110, and a fixed connection to ballast 108. For freshwater applications involving small target species, triple swivel 106 might be replaced by a three-way swivel. However, current commercially available three-way swivels are limited in strength, and may break if used for applications (e.g. saltwater applications) involving large target species (e.g., sharks or billfish). Bearing in mind that breakage of triple swivel 106 could cause tackle separation or loss (including possible loss of an expensive transmitter), it is important that triple swivel 106 be sufficiently strong to resist the range of forces that might arise in the intended fishing application. One or more of screw-pin shackles 204, 206 and 208 may be replaced by snap shackles, clevis pin shackles, toggle pin shackles or other coupling devices that permit the shackles to be opened and closed. Ballast 108 may be moved upward past the end of hollow spar 118, or spar 118 could be extended downwardly past the end of ballast 108, and shackle 206 could be fastened to hollow spar 118. The plate form for ballast 108 shown in FIG. 1 and FIG. 3 could be replaced by weights or other devices that help keep trigger mechanism and transmitter 122 upright in the water. Hollow spar 118 may be replaced by a bar or other structure equipped with guides or other devices to capture trigger line 116. Float 120 may have buoyancy and positioning sufficient to keep only antenna 124 above or generally above the waterline, or greater buoyancy or positioning sufficient to keep both antenna 124 and transmitter 122 above or generally above the waterline. Snatch block 114 or trigger mechanism and transmitter 122 may be made of simpler construction. For example, snatch block 114 may be replaced by a spring clip or other frangible or detachable connection or temporary coupling, and equipped with a breakable or bendable link that will enable trigger line 116 and its associated trigger components to be actuated and leader 110 to be released and generally straightened following a strike. The respective connections and temporary coupling for such a spring clip or other frangible or detachable connection may be reversed as discussed above. Trigger line 116 may be replaced by an actuating rod and a suitable actuating lever or levers so as to compress rather than pull a trigger mechanism when a strike occurs. A magnet may be placed in trigger slide 402 to activate transmitter 418, and actuator 412 and its associated spring 504 and screw 506 may be removed and a simpler locking mechanism employed to keep slide 402 in position following a strike. Trigger mechanism and transmitter 122 may also be designed to cease signaling rather than starting signaling when a strike occurs. Radio transmitter 418 may be replaced by a device that produces light pulses or provides some other indication (preferably buoy-specific) that a strike has occurred. Multiple ballasts, snatch blocks, swivel and leader assemblies may be placed in series together with a single float and transmitter, and the transmitter may be actuated by a single trigger line or multiple trigger lines.

The disclosed fishing buoy has a number of advantages, especially when used in an array (e.g., at least 2, at least 10, at least 50 or at least 100 or more) of such buoys. A hooked species may swim around the buoy without the leader becoming twisted or otherwise entangled or fouled in the buoy. The percentage of escaped target fish may be reduced. Large target species which need to keep swimming in order to stay alive (e.g., large sharks, billfish and grouper) may survive until the buoy can be serviced rather than dying prematurely. Non-target species which need to surface for air (e.g., dolphins and sea turtles) may survive until they can be unhooked and released. Attacks by airborne or swimming predators may also be reduced because the hooked species may remain submerged as needed while avoiding buoy entanglement. The disclosed anti-fouling mechanism thus may prolong life or reduce injury for marine species hooked by the disclosed fishing buoy.

Current fishing gear and methods require tedious serial checking of all longline hooks or buoys in an array, thereby increasing the time, number of vessels or number of fishing personnel needed to clean and re-bait hooks. The present invention enables fisheries and fishing personnel to decrease reliance on longline fishing and adopt array fishing methods yielding reduced injury or premature mortality for target species, and reduced injury or mortality for protected or endangered bycatch. The disclosed array enables fishing personnel to give more rapid attention to specific buoys in an array so that fish or other hooked animals including bycatch may be removed from leaders as quickly as possible and visits to undisturbed buoys may be minimized. The array thus enables prompt and accurate determination of which buoys in the array have hooked catch or bycatch and which do not, thereby reducing servicing delays.

The disclosed buoy and array may promote more efficient fishing and may reduce fishing costs. Fishing personnel may be made aware of a strike the moment something has taken the bait. This may make it possible for one vessel, rather than the several vessels that are normally required, to service a buoy array. It may also make it possible for a servicing vessel temporarily to halt deployment of other buoys in an array in order to service a recently deployed buoy that has hooked a target species or bycatch.

Having thus described the preferred embodiments of the present invention, those of skill in the art will readily appreciate that the teachings found herein may be applied to yet other embodiments within the scope of the claims hereto attached.

What is claimed is:

1. A fishing buoy comprising:
a multi-axis swivel having a base, first and second attachment points connected to the base and arrayed along a central first axis, and a third attachment point connected to the base and arrayed along a second axis which is at an angle to the central first axis, wherein the first and second attachment points rotate without limitation with respect to the base and the third attachment point rotates without limitation around the second axis;
an anchor or other underwater restraining device connected to the first attachment point;
a ballast, float and a transmitter having a transmission state, connected to one another and to the second attachment point;
a leader connected to the third attachment point and to at least one baitable hook;
a fish strike trigger connected to the transmitter and temporarily coupled to the leader, or connected to the leader and temporarily coupled to the transmitter;
wherein after a fish or bycatch strike, the trigger changes the transmitter state to provide an indication that a strike has occurred, the leader and the transmitter are decoupled, and the leader is free to rotate around the central axis without entangling the anchor or other underwater restraining device.

2. A buoy according to claim 1 wherein the first and second attachment points each rotate without limitation around the central axis.

3. A buoy according to claim 1 wherein the second axis is perpendicular to the central axis.

4. A buoy according to claim 1 wherein the third attachment point has at least 180 degree freedom of rotation around the second axis.

5. A buoy according to claim 1 wherein each of the first, second and third attachment points respectively have at least 180 degree freedom of rotation around the first central axis and the second axis.

6. A buoy according to claim 1 wherein the trigger is connected to the transmitter and temporarily coupled to the leader.

7. A buoy according to claim 1 wherein the trigger is connected to the leader and temporarily coupled to the transmitter.

8. A buoy according to claim 1 further comprising a snatch block connected to the trigger and temporarily coupled to the leader.

9. A buoy according to claim 8 wherein the snatch block comprises a pulley, prior to a strike the leader is wrapped partially around the pulley and after a strike the leader is decoupled from the pulley.

10. A buoy according to claim 1 further comprising a snatch block connected to the leader and temporarily coupled to the trigger.

11. A buoy according to claim 10 wherein the snatch block comprises a pulley, prior to a strike a trigger line connected to the trigger and ballast is wrapped partially around the pulley and after a strike the trigger line is decoupled from the pulley.

12. A buoy according to claim 1 wherein the strike has a corresponding strike force and the trigger can be adjusted to respond to different strike forces, patterns of strikes, duration of strike forces, or combinations thereof and thereby reduce false indications that a strike has occurred.

13. A buoy according to claim 1 further comprising a hollow spar connecting the ballast and trigger, and a trigger line inside the spar temporarily coupled between the trigger and leader.

14. A buoy according to claim 13 wherein when the buoy is in water, the ballast helps keep the spar upright and the transmitter out of the water.

15. A buoy according to claim 1 wherein the transmitter comprises a radio and antenna.

16. A buoy according to claim 1 wherein the leader is free to rotate around the central axis without entangling any buoy components.

17. A plurality of buoys according to claim 1 in the form of an array.

18. A plurality of buoys according to claim 17 secured to underwater structures.

19. A plurality of buoys according to claim 17 deployed adrift.

20. A buoy according to claim 1 which promotes bycatch survival compared to longline fishing.

21. A buoy according to claim 1 which reduces catch injury or premature mortality compared to longline fishing.

22. A buoy according to claim 1 wherein when the buoy is in water, the ballast reduces or otherwise dampens rotation of the ballast, float, and transmitter attached above the multi-axis swivel relative to the anchor or other underwater restraining device attached below the multi-axis swivel.

23. A method for fishing comprising deploying in a fishery a plurality of buoys according to claim 1, and landing targeted caught species and releasing protected or endangered bycaught species hooked by said buoys.

\* \* \* \* \*